Oct. 8, 1929.    M. LINTON    1,731,143
LOCOMOTIVE TRUCK
Filed May 18, 1928    3 Sheets-Sheet 1

Oct. 8, 1929.  M. LINTON  1,731,143
LOCOMOTIVE TRUCK
Filed May 18, 1928  3 Sheets-Sheet 2

Oct. 8, 1929.　　　M. LINTON　　　1,731,143
LOCOMOTIVE TRUCK
Filed May 18, 1928　　　3 Sheets-Sheet 3
Fig. 3.
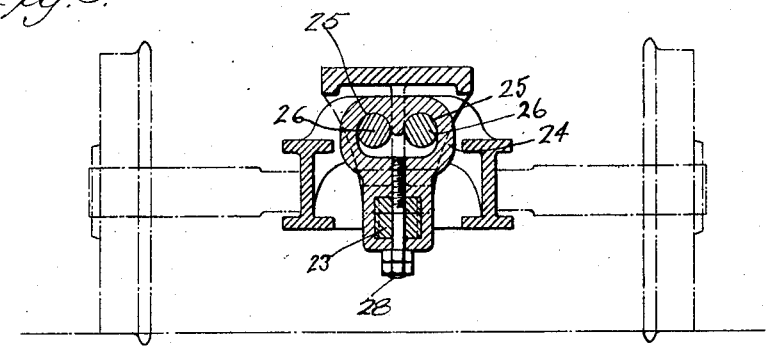
Fig. 4.
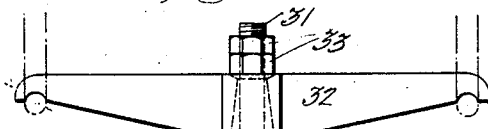
Fig. 7.
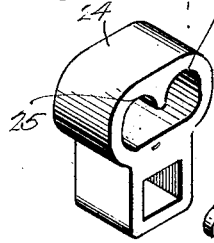
Fig. 13.
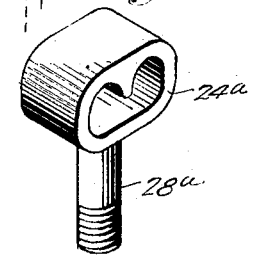
Fig. 8.
Fig. 9.
Fig. 14.
Fig. 12.
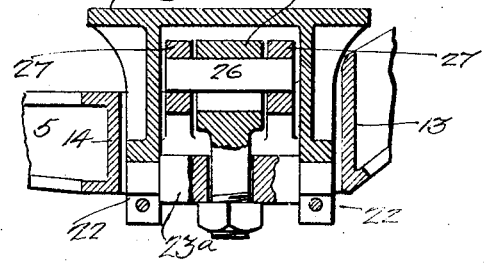
Inventor:
Morris Linton
by his Attorneys Patented Oct. 8, 1929

1,731,143

UNITED STATES PATENT OFFICE

MORRIS LINTON, OF SWARTHMORE, PENNSYLVANIA

LOCOMOTIVE TRUCK

Application filed May 18, 1928. Serial No. 278,897.

My invention relates to certain improvements in locomotive trucks, particularly the swiveled trucks located at one or both ends of a locomotive.

The object of my invention is to improve the construction of a locomotive truck of the above type, so that the truck will readily accommodate itself to the curves of the track, having ample space to swing without being hampered by links and bolsters, the frame of the truck being part of the equalizing gear of the locomotive.

In the accompanying drawings:

Fig. 3 is a transverse sectional view on the line 3—3 of Fig. 1;

Fig. 4 is a detached view showing the link and the cross-bar of the equalizing gear;

Fig. 5 is an enlarged view partly in section of the rocker bar and its bearing;

Fig. 6 is an end view of Fig. 5;

Figs. 7, 8 and 9 are detached perspective views of the rocker and rocker-bar and bearing block, respectively;

Fig. 10 is a sectional view on the line 10—10, Fig. 1;

Fig. 11 is a detached plan view of the frame;

Fig. 12 is a sectional view illustrating a modification of the rocker; and

Figs. 13 and 14 are detached perspective views of the rocker and bar shown in Fig. 10.

Figure 1:
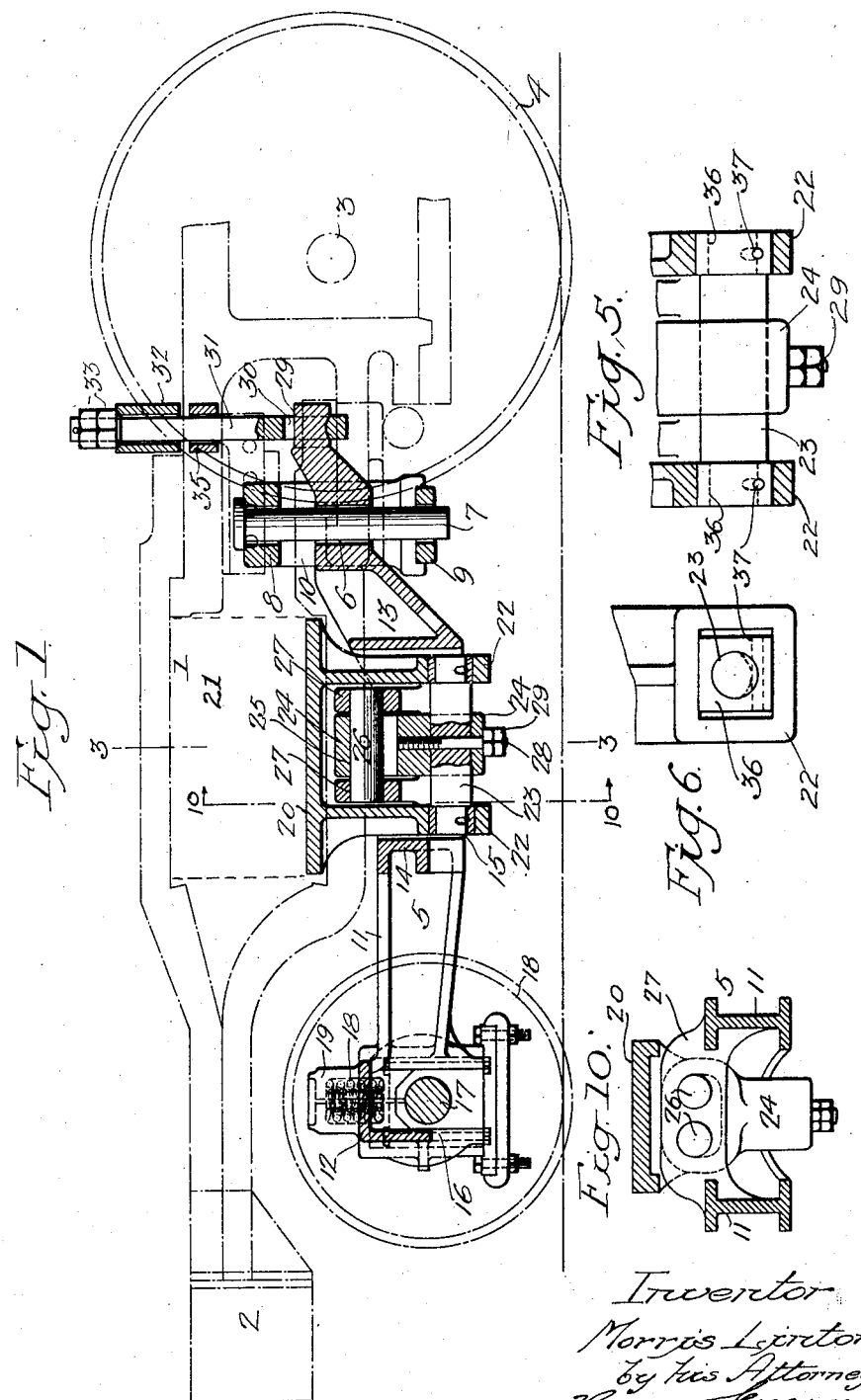
Fig. 1 is a longitudinal sectional view of my improved locomotive truck, showing part of the frame and one of the driving wheels in dotted lines.
Figure 2:
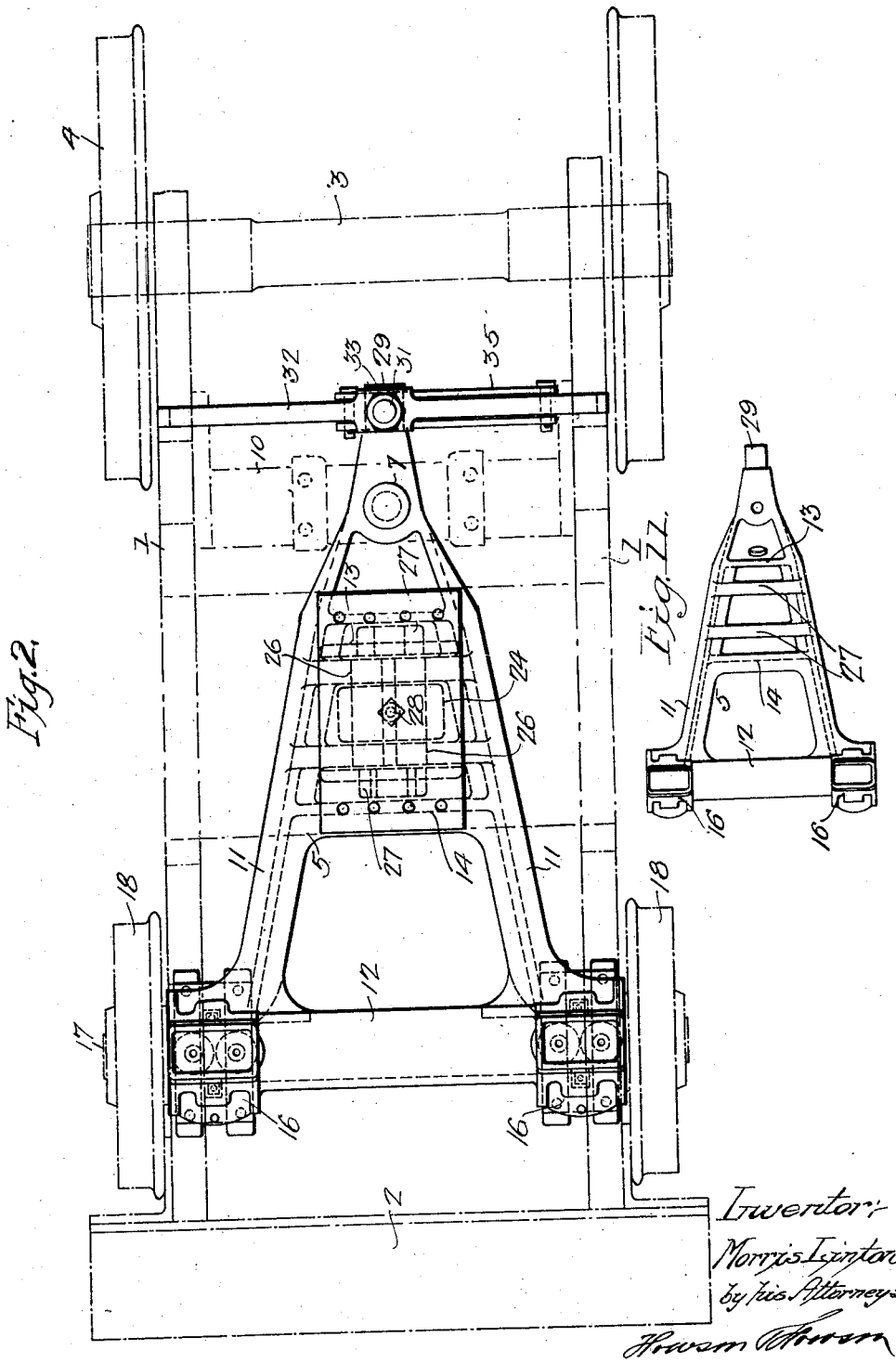
Fig. 2 is a plan view of the truck, also showing the frame and a pair of driving wheels in dotted lines.

Referring to the drawings, 1—1 are the side frames of a locomotive; 2 is the bumper beam; and 3 is the forward driving axle on which are wheels 4—4, these parts being shown by dotted lines so as to avoid confusion.

5 is the truck frame, having a vertical opening 6 for a pivot pin 7 mounted in bearings 8 and 9. The bearing 8 forms part of a transverse frame 10 which is secured to the side frames of the locomotive. The bearing 9 is in the form of a cap plate which is secured to the underside of the frame 10 in the present instance.

The truck frame consists of two longitudinal members 11—11 connected together at one end by the pivot bearing and at the opposite end by a cross-bar 12, angular in cross-section, and intermediate cross-bars 13 and 14 which are spaced apart to form a cavity 15 for the suspension links.

On the frame are journal boxes 16 for axles 17 on which are mounted the flanged truck wheels 18.

Between each box and the extension 19 of the frame are springs 18 of any suitable type.

20 is a transverse plate extending from one side frame 1 to the other, the plate 20 being secured to the cylinder structure 21, in the present instance. Depending from the plate 20 are fulcrums 22 in which the bearing blocks 36 for the journals of the rocker-bar 23 are mounted.

The bearing blocks 36 are rectangular as shown in Figs. 6 and 9 and are arranged to slide laterally in the fulcrums 22. Pins 37 hold the blocks to the journals of the rocker-bar.

The rocker-bar 23 is preferably rectangular in cross-section, as shown in Fig. 3. Mounted on the bar is a rocker 24 having two bearings 25—25 at its upper end for the pins 26—26, the ends of which extend into openings in brackets 27 which are in the present instance cast integral with the side members of the truck frame 5.

The link 24 is rigidly secured to the rocker-bar 23 by a stud 28 on which are nuts 29. Other means of fastening the link to the rocker-bar may be used without departing from the essential features of the invention.

The above mechanism is located in the space 15 between the cross members 13 and 14 in the truck.

On the end of the truck, beyond the pivot pin 7, is an extension 29 in the form of an integral pin which is adapted to an opening 30 in a link 31. This link extends through an opening in the cross-bar 32 of an equalizing gear, the links of the gear being attached to the ends of the bar, as shown by dotted lines in Fig. 4. The upper end of the link 31 is threaded and on the threaded portion are nuts 33. Depending from the cross-bar 32 is a lug 34 to which a link 35 is attached. This link connects the cross-bar 32 with one of the side frames of the locomotive, so as to hold the cross-bar in the central position, yet allowing it free vertical movement. By this arrangement the frame of the truck becomes the end lever of the equalizing gear of the locomotive, and as the pivot is some distance from the axle, the entire truck is free to swing without interference.

It will be seen by the above construction that the truck is free to move laterally to accommodate itself to the rails, and that the lateral movement is not limited by the usual rocking links and equalizing levers, which were heretofore so located that the lateral movement of the truck was limited and the mechanism was rather inaccessible.

The truck is of a two-wheel type, the axle being some distance from the center of the pivot 7 and is connected to the main frame of the locomotive through the rocker, which tends to bring the truck to a central position after the locomotive has passed around a curve and the pivot end of the truck is connected to the equalizing gear of the locomotive, so that while the axle end of the truck is allowed a certain amount of movement through the arrangement of the springs 18, the opposite end of the truck will be evenly suspended from the forward cross-bar of the equalizing gear of the locomotive, the frame becoming the end member of the equalizing gear as stated above.

Figs. 11, 12 and 13 illustrate modifications of the rocker. In these figures the rocker 24ª has a threaded stem 28ª which extends through an opening in the rocker-bar 23ª. A nut on the stem is located under the bar.

I claim :—

1. The combination in a swing truck for locomotives, of a truck frame connected at one end to the equalizing gear of the locomotive and forming the end member of said gear; a pivot for the truck at the end which is connected to the said equalizing gear; an axle mounted on the opposite end of the truck; wheels on the axle; and a swing link connecting the truck with the body of the locomotive intermediate the ends thereof.

2. The combination in a swing truck for locomotives, of a truck frame pivoted thereto, said frame having a projection beyond the pivot; and equalizing gear connected to the projection, said truck forming the end member of the said gear; an axle mounted on the opposite end of the truck; wheels on the axle; and a flexible connection with the body of the locomotive and the truck, said connection being about midway between the pivot of the truck and the axle.

3. A locomotive truck; a truck frame mounted thereunder and pivoted thereto, said pivot being at one end of the truck; an axle; wheels at the opposite end of the truck; an equalizing gear, the truck frame forming the end member of said gear; a plate secured to the locomotive structure and having fulcrums; blocks mounted in the fulcrums and arranged to have a limited lateral movement therein; a rocking bar mounted in the blocks; a rocker on said bar; and two pins mounted on the truck and extending through the rocker.

4. The combination in a locomotive truck, of side frames; a cross frame connected to the side frames; a pivot pin mounted on the cross frame; a truck frame pivotally mounted on said pin and free to move vertically thereon; an axle at the opposite end of the truck frame; wheels on the axle; a transverse fulcrum secured to the locomotive structure and extending between the pivot pin and the axle of the truck; and a rocker mechanism connecting the truck to said fulcrum.

5. The combination in a locomotive truck, of side frames; a cross frame having bearings thereon; a vertical pivot pin extending through the bearings; a truck frame pivotally mounted on the pin; an axle at the opposite end of the truck from the pin; wheels on the axle; a transverse fulcrum plate secured to the locomotive structure; a rocker connection between the said plate and the truck, said truck having an extension; and a connection between the extension of the truck and the equalizing gear of the locomotive.

6. The combination in a locomotive truck, of side frames; a cross frame; a vertical pivot pin mounted on the cross frame; a two-wheel truck frame having an opening through which the pivot pin extends, said truck frame being free to move vertically on the pin; an axle at the opposite end of the truck; wheels on the axle; boxes carried by the frame in which the axle is mounted; springs mounted between the axle and the truck frame, said truck frame having an extension beyond the pivot pin; a cross bar; an equalizing gear; a connection between the extension and the cross-bar; a plate secured to the locomotive structure and having depending fulcrums; an opening in the truck between the pivot pin and the axle in which the fulcrums of the plate are located; a rocker-bar journaled in the fulcrums; a rocker on said bar; and two pins on said truck, said pins extending through the rocker.

MORRIS LINTON.